UNITED STATES PATENT OFFICE.

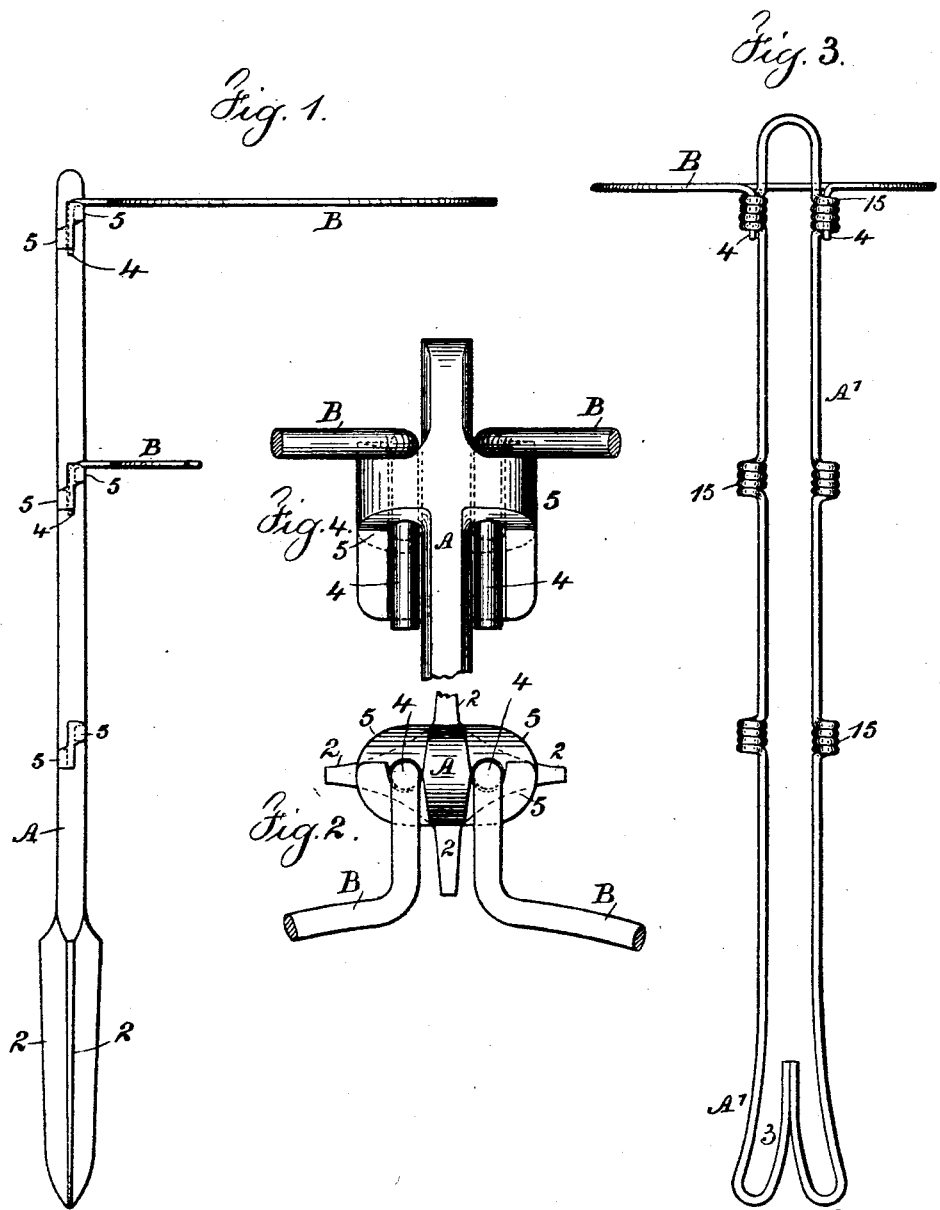

WILLIAM A. MILLS, OF PORT CHESTER, NEW YORK.

PLANT-SUPPORT.

SPECIFICATION forming part of Letters Patent No. 541,285, dated June 18, 1895.

Application filed October 11, 1894. Serial No. 525,549. (No model.)

*To all whom it may concern:*

Be it known that I, WILLIAM A. MILLS, a citizen of the United States, residing at Port Chester, in the county of Westchester and State of New York, have invented an Improvement in Plant-Holders, of which the following is a specification.

Long and slender plants such as carnations and chrysanthemums, often require supports to prevent the weight of the flowers bending the stalks and causing the flowers to fall to the ground. To hold up such plants stakes have been made use of with movable hoops to be connected with the stakes, but the connecting devices have been difficult to make and the hoop has been liable to sag or drop by its weight and not to retain its position at right angles to the stake. I make use of a wire hoop with the ends turned downwardly, and the stock is provided with eyes into which the vertical ends of the hoop are received, so that the hoop is held at right angles to the stake, and upon the stake the eyes are provided at different heights so that the hoop can be raised from time to time as the plants grow taller.

In the drawings, Figure 1 is a side view representing the improved plant-holder. Fig. 2 is a plan view, on an enlarged scale, showing the construction of the eye. Fig. 3 is a diagram illustrating a modification in which the stake is made of wire. Fig. 4 is an elevation of the upper end of the stake and section of the ring, on an enlarged scale, corresponding to Fig. 2.

The stake A is provided with any suitable point to enter into the ground. In Figs. 1 and 2 the stake is represented with a base formed of the crossing plates 2, and in Fig. 3 the wire stake A' is represented as doubled at 3 to strengthen the wire base and to increase the surface of the wire in contact with the earth.

Upon the stake there are eyes for the reception of the downwardly turned ends 4 of the hoops B, which hoops are of any suitable size and preferably circular, and the eyes upon the stakes being adapted to the reception of the downwardly projecting ends 4 of the hoops B, sustain such hoops B at right angles or nearly so to the stake.

When the stake is made of cast metal, as shown in Figs. 1, 2 and 4, it is advantageous to make the half eyes 5 standing in opposite directions and one above the other so that the eyes can be cast and do not require to be bored or otherwise finished by hand, and by placing the ends 4 of the hoops B into these half eyes 5, as shown in Fig. 1, the weight of the hoop is reliably sustained, and the hoop being made of wire can be sprung open so as to pass the same around the plant and sprung together to insert the downwardly projecting ends into the eyes at the opposite sides of the stake and thereby hold the plant reliably, and the hoop can be raised from time to time as the plant grows taller, or a second or third hoop can be made use of upon the same stake for holding up the plant or plants.

It will be apparent that one stake may be provided for several hoops standing in different directions and of any desired size to support by each hoop one or more plants.

When the stake is made of wire, as illustrated in the diagram Fig. 3, the wire is to be bent into short helices or coils 15 at proper intervals for the reception of the downwardly bent ends 4 of the hoops B, and it is advantageous to make the stake double, the bend in the wire being at the top end, and the two vertical portions of the wire forming the stake advantageously diverge slightly, and the lower ends of the wire are folded upwardly to form the base, as shown at 3, and this wire stake can easily be thrust into the earth and will stand firmly, especially when the earth is pressed tightly around the wire which is in the earth.

I claim as my invention—

1. The combination in a plant holder with the wire hoop having downwardly turned ends, of a stake having upon its exterior surface eyes at two or more places for receiving the downwardly turned ends of the hoop, substantially as set forth.

2. The combination with a wire hoop having downwardly turned ends, of a stake having eyes cast upon its sides with the half portions of the eyes in opposite directions and one above the other, substantially as set forth.

3. The combination with a wire hoop having downwardly turned ends, of a stake having eyes cast upon its sides with the half portions of the eyes in opposite directions one above the other, and a base formed of crossing plates, substantially as set forth.

Signed by me this 5th day of October, 1894.

W. A. MILLS.

Witnesses:
J. W. DIEHL,
GEO. A. STUDWELL.